(12) United States Patent
Fernandez Alonso et al.

(10) Patent No.: US 12,262,294 B2
(45) Date of Patent: Mar. 25, 2025

(54) EXTENSION OF Npcf_EventExposure WITH USAGE MONITORING EVENT

(71) Applicant: Telefonaktiebolaget LM Ericsson (publ), Stockholm (SE)

(72) Inventors: Susana Fernandez Alonso, Madrid (ES); Fuencisla Garcia Azorero, Madrid (ES); Antonio Iniesta Gonzalez, Madrid (ES); Maria Belen Pancorbo Marcos, Madrid (ES); Ignacio Rivas Molina, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 359 days.

(21) Appl. No.: 17/795,307

(22) PCT Filed: Feb. 3, 2021

(86) PCT No.: PCT/IB2021/050882
§ 371 (c)(1),
(2) Date: Jul. 26, 2022

(87) PCT Pub. No.: WO2021/156771
PCT Pub. Date: Aug. 12, 2021

(65) Prior Publication Data
US 2023/0080830 A1 Mar. 16, 2023

Related U.S. Application Data

(60) Provisional application No. 62/969,367, filed on Feb. 3, 2020.

(51) Int. Cl.
*H04W 4/60* (2018.01)
(52) U.S. Cl.
CPC .................................. *H04W 4/60* (2018.02)

(58) Field of Classification Search
None
See application file for complete search history.

(56) References Cited

U.S. PATENT DOCUMENTS

2019/0261260 A1* 8/2019 Dao ...................... H04W 48/00
2019/0268835 A1* 8/2019 Shan ..................... H04W 48/16

FOREIGN PATENT DOCUMENTS

| EP | 3783993 A1 | 2/2021 |
| WO | 2019206099 A1 | 10/2019 |

OTHER PUBLICATIONS

Author Unknown, "Technical Specification Group Services and System Aspects; System architecture for the 5G System (5GS); Stage 2 (Release 16)," Technical Specification 23.501, Version 16.3.0, Dec. 2019, 3GPP Organizational Partners, 417 pages.

(Continued)

*Primary Examiner* — Frantz Bataille
(74) *Attorney, Agent, or Firm* — Withrow & Terranova, PLLC

(57) ABSTRACT

Systems and methods are disclosed herein for event notification in a core network of a cellular communications system. In one embodiment, a method performed by a first Policy and Control Function (PCF) serving an Access Management (AM) policy association for a User Equipment (UE) wherein the first PCF is comprised in a core network of a cellular communications system comprises subscribing to an event exposure service of a second PCF serving a Session Management (SM) policy association for the UE. The method further comprises, responsive to subscribing to the event exposure service of the second PCF, receiving a report from the second PCF. In this manner, separate deployments of the first and second PCFs are enabled and still the first PCF serving the AM policy association for the UE can (Continued)

implement AM policies for the UE, e.g., based on UE data usage, e.g., of specified service bundles.

18 Claims, 12 Drawing Sheets

(56) References Cited

OTHER PUBLICATIONS

Author Unknown, "Technical Specification Group Services and System Aspects; Procedures for the 5G System (5GS); Stage 2 (Release 16)," Technical Specification 23.502, Version 16.3.0, Dec. 2019, 3GPP Organizational Partners, 558 pages.

Author Unknown, "Technical Specification Group Services and System Aspects; Policy and charging control framework for the 5G System (5GS); Stage 2 (Release 16)," Technical Specification 23.503, Version 16.3.0, Dec. 2019, 3GPP Organizational Partners, 112 pages.

Ericsson, "S2-172497: PCF Discovery and Selection," 3GPP SA WG2 Meeting #120, Mar. 27-31, 2017, Busan, South Korea, 4 pages.

Ericsson, "S2-200xxx: Extending PCF Event Exposure Service," 3GPP SA WG2 Meeting #137, Feb. 24-28, 2020, New Delhi, India, 2 pages.

Ericsson, "S2-200xxx: PCF Event Exposure," 23.502 Change Request, 3GPP SA WG2 Meeting #S2-137, Nov. 18-22, 2019, Reno, Nevada, 6 pages.

Ericsson, "S2-200xxx: PCF Event Exposure," 23.503 Change Request, 3GPP SA WG2 Meeting #S2-137, Nov. 18-22, 2019, Reno, Nevada, 10 pages.

Huawei, et al., "S2-172072: TS 23.501 Decoupling policy control for Access Management and Session Management," 3GPP SA WG2 Meeting #120, Mar. 27-31, 2017, Busan, South Korea, 9 pages.

International Search Report and Written Opinion for International Patent Application No. PCT/IB2021/050882, mailed Apr. 8, 2021, 14 pages.

International Preliminary Report on Patentability for International Patent Application No. PCT/IB2021/050882, mailed Jan. 10, 2022, 20 pages.

\* cited by examiner

EXTENSION OF Npcf_EventExposure WITH USAGE MONITORING EVENT

RELATED APPLICATIONS

This application is a 35 U.S.C. § 371 national phase filing of International Application No. PCT/IB2021/050882, filed Feb. 3, 2021, which claims the benefit of provisional patent application Ser. No. 62/969,367, filed Feb. 3, 2020, the disclosures of which are hereby incorporated herein by reference in their entireties.

TECHNICAL FIELD

The present disclosure relates to a cellular communications system and, more specifically, to event exposure in a core network of a cellular communications system.

BACKGROUND

In the Third Generation Partnership Project (3GPP) Fifth Generation System (5GS), the Npcf_EventExposure service is provided by the Policy and Control Function (PCF) and enables a Network Function (NF) to subscribe to and get notified about PCF events for a group of User Equipment(s) (UE(s)) or any UE accessing a combination of Data Network Name (DNN) and Single Network Slice Selection Assistance Information (S-NSSAI). The Npcf_EventExposure service is described in 3GPP Technical Specification (TS) 23.502 V16.3.0 Section 5.2.5.7, which is reproduced in the excerpt from 3GPP TS 23.502 V16.3.0 below.

Start Excerpt from 3GPP TS 23.502

5.2.5.7 Npcf_EventExposure Service
5.2.5.7.1 General
Service description: This service enables an NF to subscribe and get notified about PCF events for a group of UE(s) or any UE accessing a combination of (DNN, S-NSSAI).
The events can be subscribed by a NF consumer are described in TS 23.503 [20], clause 6.1.3.18.
The following service operations are defined for the Npcf_EventExposure service:
  Npcf_EventExposure_Subscribe.
  Npcf_EventExposure_UnSubscribe.
  Npcf_EventExposure_Notify.
5.2.5.7.2 Npcf_EventExposure_Subscribe Service Operation
Service operation name: Npcf_EventExposure_Subscribe.
Description: The consumer NF uses this service operation to subscribe to or modify event reporting for a group of UE(s) or any UE accessing a combination of (DNN, S-NSSAI).
NF Consumers: NEF.
Inputs (required): NF ID, Target of Event Reporting (Internal Group Identifier or indication that any UE accessing a combination of (DNN, S-NSSAI) is targeted, (set of) Event ID(s) defined in clause 5.2.5.7.1, Notification Target Address (+ Notification Correlation ID) and Event Reporting Information defined in Table 4.15.1-1.
Inputs (optional): Event Filter (s) associated with each Event ID.
Outputs (required): Operation execution result indication. When the subscription is accepted: Subscription Correlation ID.
Outputs (optional): First corresponding event report is included, if corresponding information is available (see clause 4.15.1).

The NF consumer subscribes to the event notification by invoking Npcf_EventExposure to the PCF. The PCF allocates a Subscription Correlation ID for the subscription and responds to the consumer NF with the Subscription Correlation ID. Event receiving NF ID identifies the NF that shall receive the event reporting.
5.2.5.7.3 Npcf_EventExposure_Unsubscribe Service Operation
Service operation name: Npcf_EventExposure_Unsubscribe.
Description: The NF consumer uses this service operation to unsubscribe for a specific event for a group of UE(s) or any UE accessing a combination of (DNN, S-NSSAI).
Inputs (required): Subscription Correlation ID.
Input, Optional: None.
Outputs (required): Operation execution result indication.
Output, Optional: None.
5.2.5.7.4 Npcf_EventExposure_Notify Service Operation
Service operation name: Npcf_EventExposure_Notify.
Description: This service operation reports the event to the consumer that has previously subscribed.
Inputs (required): Event ID, corresponding UE ID (GPSI), Notification Correlation Information, time stamp.
Inputs (optional): None.
Outputs (required): None.

End Excerpt from 3GPP TS 23.502

The Npcf_EventExposure service is provided by the PCF as defined in "Table 5.2.5.1-1: NF services provided by PCF" in 3GPP TS 23.502, an excerpt of which is shown below as Table 1:

TABLE 1

| | Npcf_EventExposure | | |
| Service Name | Service Operations | Operation Semantics | Example Consumer (s) |
| --- | --- | --- | --- |
| Npcf_EventExposure | Subscribe Unsubscribe Notify | Subscribe/ Notify | NEF, NWDAF |

The Npcf_EventExposure service follows the mechanism defined by the EventExposure framework that defines the EventIDs that the PCF can provide and the target of Event Reporting to identify the target UEs in the PCF. EventIDs Public Land Mobile Network (PLMN) Identity (ID) change and Access Type change are defined in 3GPP TS 23.503 V16.3.0, as shown in Table 2.

TABLE 2

| Events IDs reported by PCF | | |
| --- | --- | --- |
| Event | Description | Availability for Bulk Subscription |
| PLMN Identifier Notification | The PLMN identifier where the UE is currently located. | Yes |
| Change of Access Type | The Access Type and, if applicable, the RAT Type of the PDU Session has changed. | Yes |

SUMMARY

Systems and methods are disclosed herein for event notification in a core network of a cellular communications system. In one embodiment, a method performed by a first Policy and Control Function (PCF) serving an Access Management (AM) policy association for a User Equipment (UE) wherein the first PCF is comprised in a core network of a cellular communications system comprises subscribing to an event exposure service of a second PCF serving a Session Management (SM) policy association for the UE. The method further comprises, responsive to subscribing to the event exposure service of the second PCF, receiving a report from the second PCF. In this manner, separate deployments of the first and second PCFs are enabled and still the first PCF serving the AM policy association for the UE can implement AM policies for the UE, e.g., based on UE data usage, e.g., of specified service bundles.

In one embodiment, the event exposure service supports reporting of usage monitoring information for the UE, and the report received from the second PCF comprises usage monitoring information for the UE. In one embodiment, the usage monitoring information comprises information that reports that the UE has reached a predefined or preconfigured usage threshold. In one embodiment, the usage monitoring information comprises information that reports that a predefined or preconfigured usage threshold has been reset.

In one embodiment, the method further comprises receiving, from an Access and Mobility Management Function (AMF), a request to create or modify an AM policy for the UE. Further, subscribing to the event exposure service of the second PCF comprises subscribing to the event exposure service of the second PCF responsive to receiving the request to create or modify the AM policy for the UE from the AMF. In one embodiment, the method further comprises sending AM related policy information for the UE to the AMF. In one embodiment, the AM related policy information comprises service area restrictions. In one embodiment, the first PCF modifies an Radio Access Technology (RAT)/Frequency Selection Priority (RFSP) index used by the AMF to perform radio resource management functionality with respect to the UE based on one or more operator policies that take into consideration the received usage monitoring information for the UE.

Corresponding embodiments of a network node for implementing a first PCF serving an AM policy association for a UE are also disclosed. In one embodiment, a network node for implementing a first PCF serving an AM policy association for a UE wherein the first PCF is comprised in a core network of a cellular communications system is adapted to subscribe to an event exposure service of a second PCF serving a SM policy association for the UE. The network node is further adapted to, responsive to subscribing to the event exposure service of the second PCF, receive a report from the second PCF.

In one embodiment, a network node for implementing a first PCF serving an AM policy association for a UE wherein the first PCF is comprised in a core network of a cellular communications system comprises processing circuitry configured to cause the network node to subscribe to an event exposure service of a second PCF serving a SM policy association for the UE. The processing circuitry is further configured to cause the network node to, responsive to subscribing to the event exposure service of the second PCF, receive a report from the second PCF.

Embodiments of a method performed by a second PCF serving a SM policy association for a UE wherein the second PCF is comprised in a core network of a cellular communications system are also disclosed. In one embodiment, the method comprises receiving, from a first PCF serving an AM policy association for the UE, a message subscribing to an event exposure service of the second PCF. The method further comprises, responsive to receiving the message subscribing to the event exposure service of the second PCF, sending a report to the first PCF (210-AM) comprising usage monitoring information for the UE.

In one embodiment, the event exposure service supports reporting of usage monitoring information for the UE, and the report received from the second PCF comprises usage monitoring information for the UE. In one embodiment, the usage monitoring information comprises information that reports that the UE has reached a predefined or preconfigured usage threshold. In one embodiment, the usage monitoring information comprises information that reports that a predefined or preconfigured usage threshold has been reset.

Corresponding embodiments of a network node for implementing a second PCF serving a SM policy association for a UE wherein the second PCF is comprised in a core network of a cellular communications system are also disclosed. In one embodiment, the network node is adapted to receive, from a first PCF serving an AM policy association for the UE, a message subscribing to an event exposure service of the second PCF. The network node is further adapted to, responsive to receiving the message subscribing to the event exposure service of the second PCF, send a report to the first PCF comprising usage monitoring information for the UE.

In another embodiment, a network node for implementing a second PCF serving a SM policy association for a UE wherein the second PCF is comprised in a core network of a cellular communications system comprises processing circuitry configured to cause the network node to receive, from a first PCF serving an AM policy association for the UE, a message subscribing to an event exposure service of the second PCF. The processing circuitry is further configured to cause the network node to, responsive to receiving the message subscribing to the event exposure service of the second PCF, send a report to the first PCF comprising usage monitoring information for the UE.

In one embodiment, a method executed in a core network of a cellular communications system comprises, at a first PCF serving an AM policy association for a UE, subscribing to an event exposure service of a second PCF serving a SM policy association for the UE and, responsive to subscribing to the event exposure service of the second PCF, receiving a report from the second PCF. The method further comprises, at the second PCF serving the SM policy association for the UE, receiving the message subscribing to the event exposure service of the second PCF from the first PCF and, responsive to receiving the message subscribing to the event exposure service of the second PCF, sending the report to the first PCF.

In one embodiment, the event exposure service supports reporting of usage monitoring information for the UE, and the report received from the second PCF comprises usage monitoring information for the UE. In one embodiment, the usage monitoring information comprises information that reports that the UE has reached a predefined or preconfigured usage threshold.

In one embodiment, the method further comprises, at the first PCF, receiving, from an AMF, a request to create or modify an AM policy for the UE. Further, subscribing to the event exposure service of the second PCF comprises subscribing to the event exposure service of the second PCF responsive to receiving the request to create or modify the AM policy for the UE from the AMF. In one embodiment, the method further comprises, at the first PCF, sending AM related policy information for the UE to the AMF. In one embodiment, the first PCF modifies a RAT/RFSP index used by the AMF to perform radio resource management functionality with respect to the UE based on one or more operator policies that take into consideration the received usage monitoring information for the UE.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
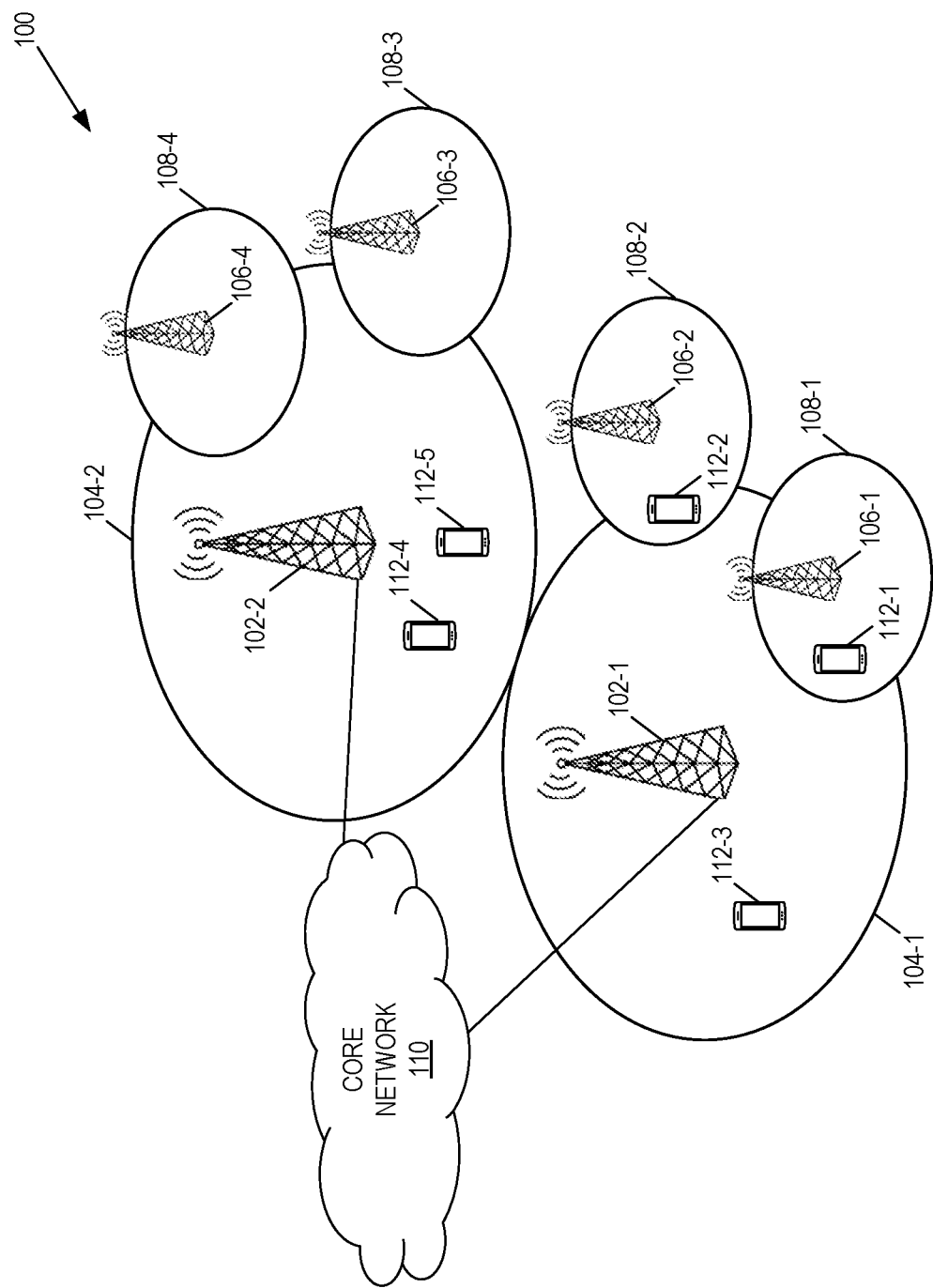
FIG. 1 illustrates an example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). As described in 3GPP TS 23.501 V16.3.0, clause 5.3.5, it is possible that the Access and Mobility Management Function (AMF) provides a Radio Access Technology (RAT) Frequency Selection Priority (RFSP) index to support Radio Resource Management (RRM) in the Radio Access Network (RAN). This index is stored in the Unified Data Management (UDM) and can be modified by the PCF based on policies.

As described in 3GPP TS 23.503 V16.3.0, it is possible that the PCF modifies the RFSP index based on operator policies that take into consideration, e.g., accumulated usage, load level information per network slice instance, etc. In order for the PCF to take into consideration accumulated usage, it is required that the PCF that handles Access and Mobility (AM) related policy control (which is referred to herein the "AM-PCF") is the same as the PCF that handles the Session Management (SM) control (which is referred to herein as the "SM-PCF"). However, these PCFs can be different and still the functionality needs to be offered. In the same way, similar dependencies are foreseen for the handling of the UE Aggregate Maximum Bit Rate (AMBR), i.e., the UE-AMBR, in the PCF that handles the AM Policy Association. Other cases can be identified in the future.

The list of Events reported by the PCF can be enhanced to report the current accumulated usage the UE may have. One application of this event would be the scenario where the RFSP index is changed based on the usage reporting, as described in 3GPP TS 23.503 as follows:

The management of the RFSP Index enables the PCF to modify the RFSP Index used by the AMF to perform radio resource management functionality as described in TS 23.501 [2] clause 5.3.4. PCF modifies the RFSP Index based on operator policies that take into consideration e.g. accumulated usage, load level information per network slice instance etc.

Importantly, there is currently no possibility for the PCF that serves the AMF to learn about accumulated usage to enable it to influence the RFSP index value, unless the PCF that serves the AMF and the PCF that serves the SMF are the same PCF (i.e., unless the AM-PCF and the SM-PCF are the same PCF).

One alternative may be to read the accumulated usage from the UDR and notify changes to the PCF serving the AMF. However, this solution will report any change on accumulated usage that may not be needed for RFSP index setting and does not allow evaluation of the RFSP index value based on the different data plans that the operator may offer to their users and, as such, this alternative is not considered as a suitable solution.

Certain aspects of the present disclosure and their embodiments may provide solutions to the aforementioned or other challenges. Based on the discussion above, embodiments are disclosed herein for extending the PCF EventExposure service to support reporting usage threshold reached per UE to the consumer (i.e., the NF consumer of the EventExposure service). Embodiments are also described herein for updating the AM Policy Association Establishment and Modification to show Npcf_EventExposure_Subscription and Notification service operation. Embodiments are also described herein for updating the AM Policy Association Termination, since the AM-PCF may send Npcf_EventExposure_Unsubscribe.

Embodiments are disclosed herein for extending the Npcf_EventExposure service for the AM-PCF to subscribe and get usage monitoring information (e.g., usage threshold reached per UE) from the SM-PCF.

Certain embodiments may provide one or more of the following technical advantage(s). Embodiments disclosed herein may allow separate deployments of the AM-PCF and the SM-PCF and still the AM-PCF can implement access and mobility policies based on the UE data usage of specified service bundles.

FIG. 1 illustrates one example of a cellular communications system 100 in which embodiments of the present disclosure may be implemented. In the embodiments described herein, the cellular communications system 100 is a 5G System (5GS) including a Next Generation RAN (NG-RAN) which may use 5G NR or a combination of 5G NR and LTE. In this example, the RAN includes base stations 102-1 and 102-2, which in the NG-RAN include 5G NR base stations (gNBs) or both gNBs and LTE base stations (which are referred to as ng-eNBs when connected to the 5G Core (5CC)), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5G core (5GC). The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

Figure 2:
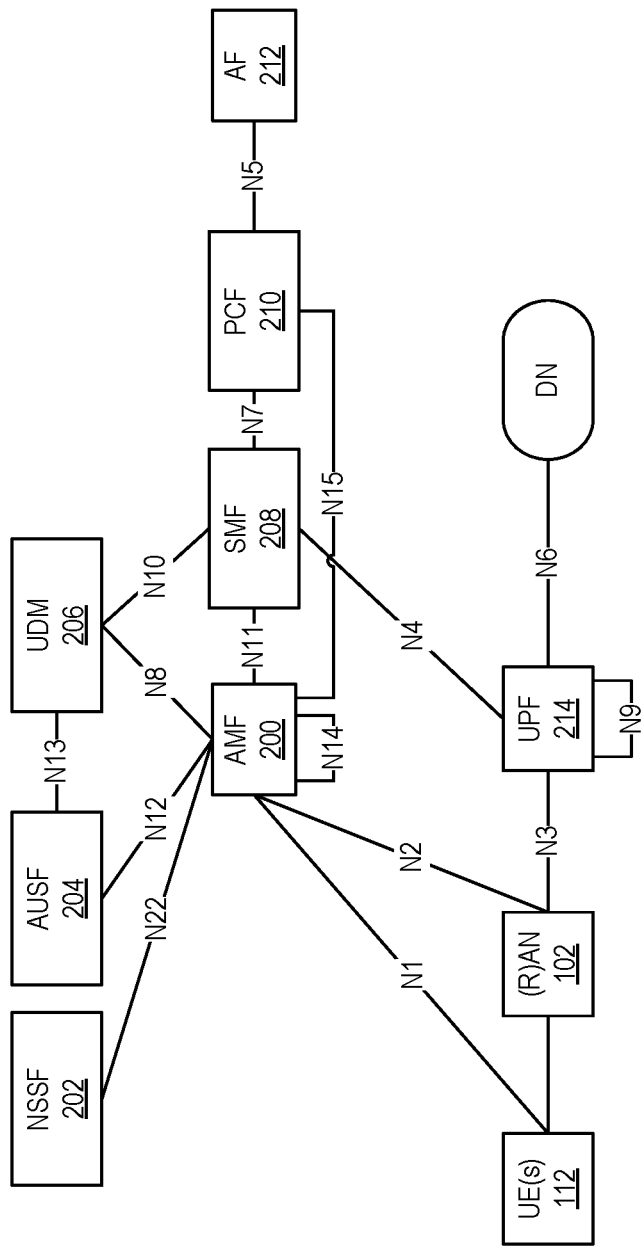
FIGS. 2 and 3 illustrate examples of the cellular communications system of FIG. 1 in which the cellular communications system is a Fifth Generation System (5GS)

FIG. 2 illustrates a wireless communication system represented as a 5G network architecture composed of core Network Functions (NFs), where interaction between any two NFs is represented by a point-to-point reference point/ interface. FIG. 2 can be viewed as one particular implementation of the system 100 of FIG. 1.

Seen from the access side the 5G network architecture shown in FIG. 2 comprises a plurality of UEs 112 connected to either a RAN 102 or an Access Network (AN) as well as an Access and Mobility Function (AMF) 200. Typically, the R(AN) 102 comprises base stations, e.g. such as eNBs or gNBs or similar. Seen from the core network side, the 5G Core (5GC) NFs shown in FIG. 2 include a NSSF 202, an Authentication Server Function (AUSF) 204, a UDM 206, the AMF 200, a Session Management Function (SMF) 208, a PCF 210, and an Application Function (AF) 212.

Reference point representations of the 5G network architecture are used to develop detailed call flows in the normative standardization. The N1 reference point is defined to carry signaling between the UE 112 and AMF 200. The reference points for connecting between the AN 102 and AMF 200 and between the AN 102 and UPF 214 are defined as N2 and N3, respectively. There is a reference point, N11, between the AMF 200 and SMF 208, which implies that the SMF 208 is at least partly controlled by the AMF 200. N4 is used by the SMF 208 and UPF 214 so that the UPF 214 can be set using the control signal generated by the SMF 208, and the UPF 214 can report its state to the SMF 208. N9 is the reference point for the connection between different UPFs 214, and N14 is the reference point connecting between different AMFs 200, respectively. N15 and N7 are defined since the PCF 210 applies policy to the AMF 200 and SMF 208, respectively. N12 is required for the AMF 200 to perform authentication of the UE 112. N8 and N10 are defined because the subscription data of the UE 112 is required for the AMF 200 and SMF 208.

The 5GC network aims at separating user plane and control plane. The user plane carries user traffic while the control plane carries signaling in the network. In FIG. 2, the UPF 214 is in the user plane and all other NFs, i.e., the AMF 200, SMF 208, PCF 210, AF 212, NSSF 202, AUSF 204, and UDM 206, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 200 and SMF 208 are independent functions in the control plane. Separated AMF 200 and SMF 208 allow independent evolution and scaling. Other control plane functions like the PCF 210 and AUSF 204 can be separated as shown in FIG. 2. Modularized function design enables the 5GC network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3:
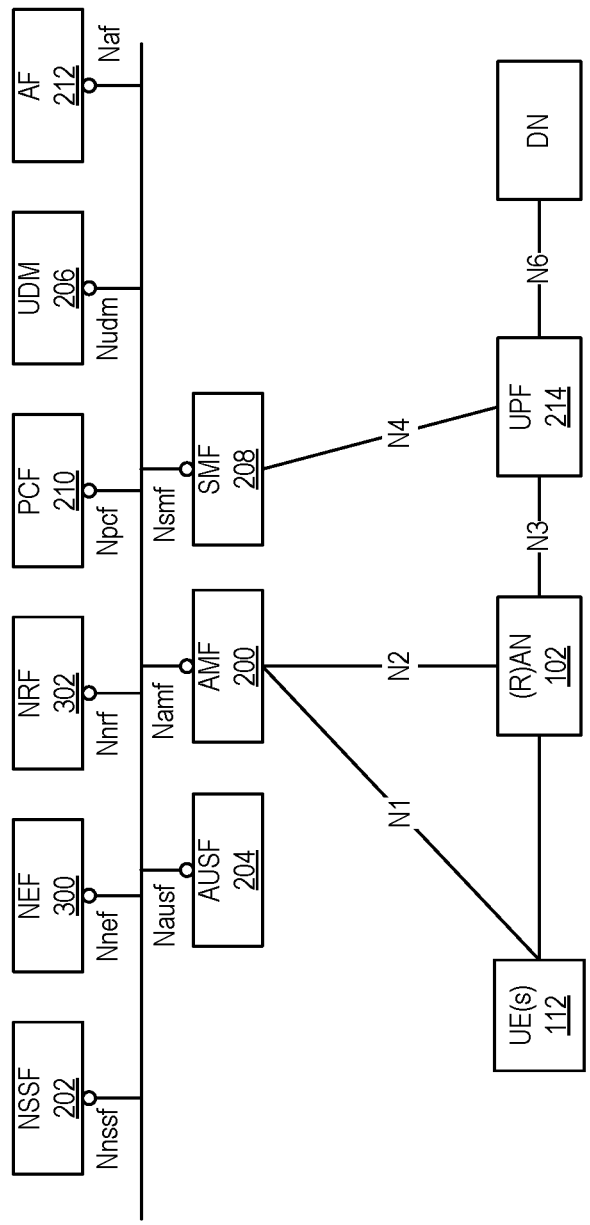

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF 200 and Nsmf for the service based interface of the SMF 208, etc. The NEF 300 and the NRF 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management and allocates Internet Protocol (IP) addresses to UEs. It also selects and controls the UPF 214 for data transfer. If a UE 112 has multiple sessions, different SMFs 208 may be allocated to each session to manage them individually and possibly provide different functionalities per session. The AF 212 provides information on the packet flow to the PCF 210 responsible for policy control in order to support Quality of Service (QoS). Based on the information, the PCF 210 determines policies about mobility and session management to make the AMF 200 and SMF 208 operate properly. The AUSF 204 supports authentication function for UEs or similar and thus stores data for authentication of UEs or similar while the UDM 206 stores subscription data of the UE 112. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Embodiments are disclosed herein for extending the PCF EventExposure service (i.e., the Npcf_EventExposure service) to support reporting usage threshold reached per UE to the consumer (i.e., the NF consumer of the PCF EventExposure service). Embodiments are also described herein for updating the AM Policy Association Establishment and Modification to show Npcf_EventExposure_Subscription and Notification service operation. Embodiments are also described herein for updating the AM Policy Association Termination, since the AM-PCF may send Npcf_EventExposure_Unsubscribe.

Embodiments are disclosed herein for extending the Npcf_EventExposure service for the AM-PCF (denoted herein as the AM-PCF 210-AM) to subscribe and get usage monitoring information (e.g., usage threshold reached per UE) from the SM-PCF (denoted herein as the SM-PCF 210-SM).

Figure 4:
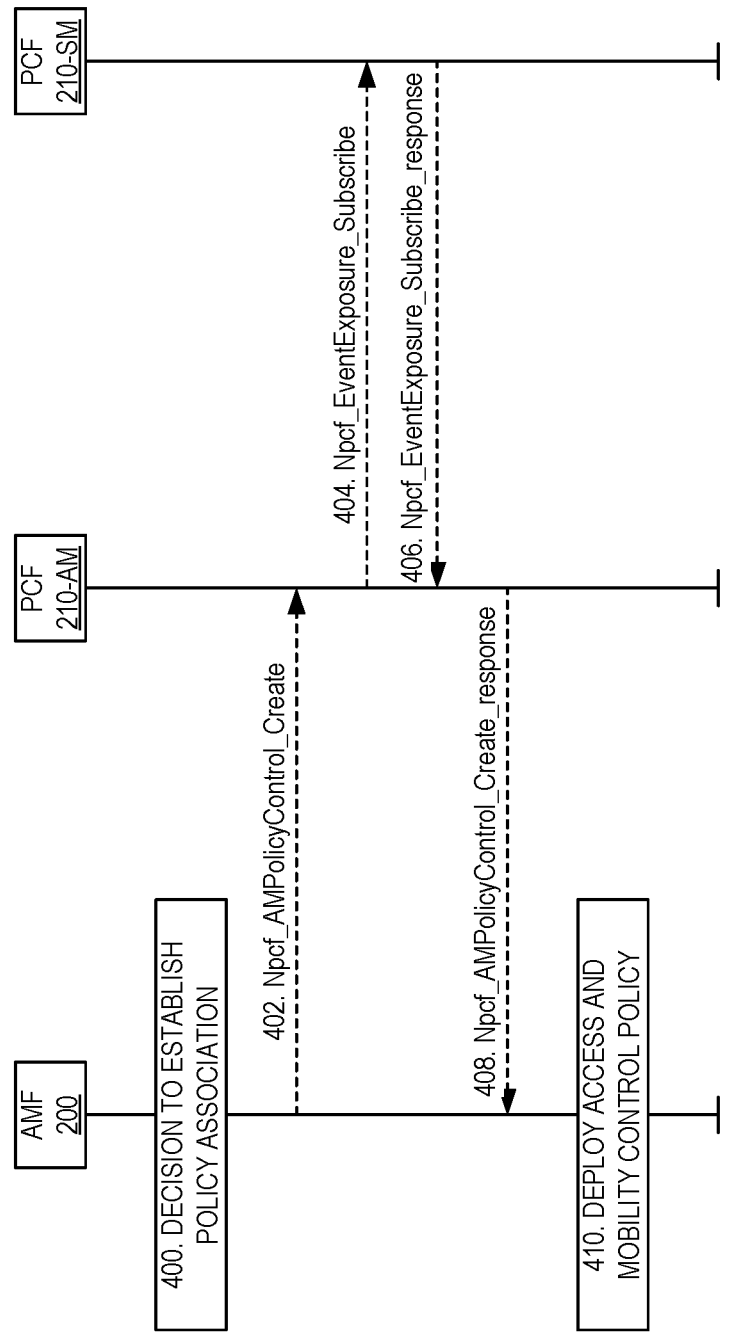
FIG. 4 illustrates the operation an Access and Mobility (AM) Policy and Control Function (PCF), i.e., an AM-PCF, and a Session Management (SM) PCF, i.e., a SM-PCF, where the AM-PCF subscribes to and gets information from the SM-PCF using an extended Npcf_EventExposure service in accordance with one example embodiment of the present disclosure.

FIG. 4 illustrates the operation an AM-PCF 210-AM and a SM-PCF 210-SM, wherein the AM-PCF 210-AM subscribes to and gets usage monitoring information (e.g., usage threshold reached per UE) from the SM-PCF 210-SM using the extended Npcf_EventExposure service in accordance with one example embodiment of the present disclosure. In particular, this example process is a process for AM policy association establishment with a new selected PCF. This procedure concerns both roaming and non-roaming scenarios.

In the non-roaming case, the role of the V-PCF is performed by the PCF serving the AM Policy Association (i.e., the AM-PCF 210-AM) that may subscribe to events reported by the PCF serving the SM Policy Association (i.e., the SM-PCF 210-SM). For the roaming scenarios, the V-PCF interacts with the AMF 200, and no interaction with the PCF serving the SM Policy Association (i.e., the SM-PCF 210-SM) is performed.

The steps of the process of FIG. 4 are as follows:

Step 400: Based on local policies, the AMF 200 decides to establish AM Policy Association with the AM-PCF 210-AM and then steps 402 to 404 are performed under the conditions described below.

Step 402: [Conditional] If the AMF 200 has not yet obtained Access and Mobility policy for the UE 112 or if the Access and Mobility policy in the AMF 200 are no longer valid, the AMF 200 requests the AM-PCF 210-AM to apply operator policies for the UE 112 from the AM-PCF 210-AM. The AMF 200 sends Npcf_AMPolicyControl_Create to the AM-PCF 210-AM to establish an AM policy control association with the AM-PCF 210-AM. The request includes the following information: Subscription Permanent Identifier (SUPI), Internal Group (see clause 5.9.7 of TS 23.501), subscription notification indication and, if available, Service Area Restrictions, Radio Access Technology (RAT)/Frequency Selection Priority (RFSP) index, Subscribed UE-AMBR, the Allowed Network Slice Selection Assistance Information (NSSAI), Generic Public Subscription Identifier (GPSI) which are retrieved from the UDM during the update location procedure, and may include Access Type and RAT Type, Permanent Equipment Identifier (PEI), User Location Information (ULI), UE time zone, and Serving Network (PLMN ID, or PLMN ID and NID, see clause 5.34 of TS 23.501).

Step 404: The AM-PCF 210-AM checks operator policies to determine if either the RFSP index and/or the UE-AMBR values needs to take into account the usage monitored for the SUPI and (DNN, S-NSSAI) (e.g., optionally for one or several combinations of (DNN, S-NSSAI)), and then sends the Npcf_EventExposure_Subscribe service operation to the SM-PCF 210-SM serving the SM Policy Association including SUPI, DNN, S-NSSAI, event set to usage reporting, and the threshold(s) if applicable. Note that the AM-PCF 200 can, in some embodiments, subscribe to only be informed that the UE usage threshold is reset.

Step 406: The SM-PCF 210-SM serving the SM Policy Association for the SUPI, DNN, S-NSSAI reports: (i) usage if any or all of the thresholds are reached and (ii) the Subscription Correlation ID, to the AM-PCF 210-AM. In one embodiment, the thresholds may also be sent.

Step 408: The AM-PCF 210-AM responds to the Npcf_AMPolicyControl_Create service operation. The AM-PCF 210-AM provides Access and mobility related policy information (e.g., Service Area Restrictions) as defined in clause 6.5 of TS 23.503. In addition, AM-PCF 210-AM can provide Policy Control Request Trigger of AM Policy Association to AMF 200.

The AMF 200 is implicitly subscribed in the AM-PCF 210-AM to be notified of changes in the policies.

Step 410: [Conditional] The AMF 200 deploys the Access and mobility related policy information which includes storing the Service Area Restrictions and Policy Control Request Trigger of AM Policy Association, provisioning Service Area Restrictions to the UE and provisioning the RFSP index, the UE-AMBR and Service Area Restrictions to the NG-RAN as defined in TS 23.501.

Example embodiments of at least some aspects of the present disclosure are described below as changes to 3GPP TS 23.502 V16.3.0 and changes to 3GGP TS 23.503 V16.3.0. Changes are indicated by underlining, strikethroughs, or by being otherwise noted.

Start of First Change to 3GPP 23.502

4.16.1.2 AM Policy Association Establishment with New Selected PCF

NEW-REPRODUCED HEREIN AS FIG. 8

Figure 4.16.1.2-1: AM Policy Association Establishment with New Selected PCF

This procedure concerns both roaming and non-roaming scenarios.

In the non-roaming case the role of the V-PCF is performed by the PCF serving the AM Policy Association that may subscribe to events reported by the PCF serving the SM Policy Association. For the roaming scenarios, the V-PCF interacts with the AMF, no interaction with the PCF serving the SM Policy Association is performed.

1. Based on local policies, the AMF decides to establish AM Policy Association with the PCF then steps 2 to 3 are performed under the conditions described below.

2. [Conditional] If the AMF has not yet obtained Access and Mobility policy for the UE or if the Access and Mobility policy in the AMF are no longer valid, the AMF requests the PCF to apply operator policies for the UE from the PCF. The AMF sends Npcf_AMPolicyControl_Create to the PCF to establish an AM policy control association with the PCF. The request includes the following information: SUPI, Internal Group (see clause 5.9.7 of TS 23.501 [2]), subscription notification indication and, if available, Service Area Restrictions, RFSP index, Subscribed UE-AMBR, the Allowed NSSAI, GPSI which are retrieved from the UDM during the update location procedure, and may include Access Type and RAT Type, PEI, ULI, UE time zone, and Serving Network (PLMN ID, or PLMN ID and NID, see clause 5.34 of TS 23.501 [2]).

3. The PCF checks operator policies to determine if either the RFSP index and/or the UE-AMBR values needs to take into account the usage monitored for the SUPI and (DNN,S-NSSAI), and then sends the Npcf_EventExposure Subscribe service operation to the PCF serving the SM Policy Association including SUPI, DNN,S-NSSAI, event set to usage reporting, and the threshold(s) if applicable.

4 The PCF serving the SM Policy Association for the SUPI, DNN, S-NSSAI reports usage if any or all of the thresholds are reached and the Subscription Correlation Id to the PCF.

5. The PCF responds to the Npcf_AMPolicyControl_Create service operation. The PCF provides Access and mobility related policy information (e.g. Service Area Restrictions) as defined in clause 6.5 of TS 23.503 [20]. In addition, PCF can provide Policy Control Request Trigger of AM Policy Association to AMF.

The AMF is implicitly subscribed in the PCF to be notified of changes in the policies.

6. [Conditional] The AMF deploys the Access and mobility related policy information which includes storing the Service Area Restrictions and Policy Control Request Trigger of AM Policy Association, provisioning Service Area Restrictions to the UE and provisioning the RFSP index, the UE-AMBR and Service Area Restrictions to the NG-RAN as defined in TS 23.501 [2].

Next Change to 3GPP 23.502

4.16.2.2 AM Policy Association Modification Initiated by the PCF
This procedure is applicable to AM Policy Association modification due to Case B.

REPRODUCED HEREIN AS FIG. 9

Figure 4.16.2.2-1: AM Policy Association Modification Initiated by the PCF

This procedure concerns both roaming and non-roaming scenarios.
In the non-roaming case the role of the V-PCF is performed by the PCF. For the roaming scenarios, the V-PCF interacts with the AMF.
NOTE: The V-PCF stores the access and mobility control policy information provided to the AMF.
1. [Conditional] PCF determines locally or triggered by the Npcf_EventExposure_Notification reporting threshold(s) reached or reset that the new status of the UE context requires new policies.
2. The (V-)PCF makes a policy decision.
3. The (V-)PCF sends Npcf_UpdateNotify including AM Policy Association ID associated with the SUPI defined in TS 29.507 [32], Service Area Restrictions, UE-AMBR or RFSP index.
4. The AMF deploys the Access and mobility related policy information, which includes storing the Service Area Restrictions and Policy Control Request Trigger of AM Policy Association, provisioning of the Service Area Restrictions to the UE and provisioning the RFSP index, UE-AMBR and Service Area Restrictions to the NG-RAN.

Next Change to 3GPP 23.502

4.16.3.2 AMF-initiated AM Policy Association Termination

REPRODUCED HEREIN AS FIG. 10

Figure 4.16.3.2-1: AMF-initiated AM Policy Association Termination

This procedure concerns both roaming and non-roaming scenarios.
In the non-roaming case the role of the V-PCF is performed by the PCF. For the roaming scenarios, the V-PCF interacts with the AMF.
1. The AMF decides to terminate the AM Policy Association during Deregistration procedure or due to mobility with change of AMF and (V-)PCF in the registration procedure or handover procedure, then if a AM Policy Association was established with the (V-)PCF steps 2 to 3 are performed.
2. The AMF sends the Npcf_AMPolicyControl_Delete service operation including AM Policy Association ID to the (V-)PCF.
3. The (V-)PCF removes the policy context for the UE, unsubscribes to notifications from PCF serving the SM Policy Association(s) if needed and replies to the AMF with an Acknowledgement including success or failure.
4. The AMF removes the AM Policy Association for this UE, including the Access and Mobility Control Policy related to the UE. The AMF deletes the subscription to AMF detected events requested for that Policy Association.

Next Change to 3GPP 23.502

5.2.5.1 General
The following table illustrates the PCF Services.

TABLE 5.2.5.1-1

| NF services provided by PCF | | | |
| --- | --- | --- | --- |
| Service Name | Service Operations | Operation Semantics | Example Consumer (s) |
| Npcf_AMPolicyControl | Create | Request/Response | AMF |
| | Update | Request/Response | AMF |
| | UpdateNotify | Subscribe/Notify | AMF |
| | Delete | Request/Response | AMF |
| Npcf_PolicyAuthorization | Create | Request/Response | AF, NEF |
| | Update | Request/Response | AF, NEF |
| | Delete | Request/Response | AF, NEF |
| | Notify | Subscribe/Notify | AF, NEF, NWDAF |
| | Subscribe | | AF, NEF, NWDAF |
| | Unsubscribe | | AF, NEF, NWDAF |
| Npcf_SMPolicyControl | Create | Request/Response | SMF |
| | UpdateNotify | Subscribe/Notify | SMF |
| | Update | Request/Response | SMF |
| | Delete | Request/Response | SMF |
| Npcf_BDTPolicyControl | Create | Request/Response | NEF |
| | Update | Request/Response | NEF |
| | Notify | | NEF |
| Npcf_UEPolicyControl | Create | Request/Response | AMF, V-PCF |
| | Update | Request/Response | AMF, V-PCF |
| | UpdateNotify | Subscribe/Notify | AMF, V-PCF |
| | Delete | Request/Response | AMF, V-PCF |

TABLE 5.2.5.1-1-continued

NF services provided by PCF

| Service Name | Service Operations | Operation Semantics | Example Consumer (s) |
|---|---|---|---|
| Npcf_EventExposure | Subscribe Unsubscribe Notify | Subscribe/Notify | NEF, NWDAF, PCF |

End of Changes to 3GPP 23.502

First Change to 3GPP 23.503

5.2.1 Non-Roaming Architecture

The reference architecture of policy and charging control framework for the 5G System is comprised by the functions of the Policy Control Function (PCF), the Session Management Function (SMF), the User Plane Function (UPF), the Access and Mobility Management Function (AMF), the Network Exposure Functionality (NEF), the Network Data Analytics Function (NWDAF), the Charging Function (CHF), the Application Function (AF) and UDR (Unified Data Repository).

Figure 5:
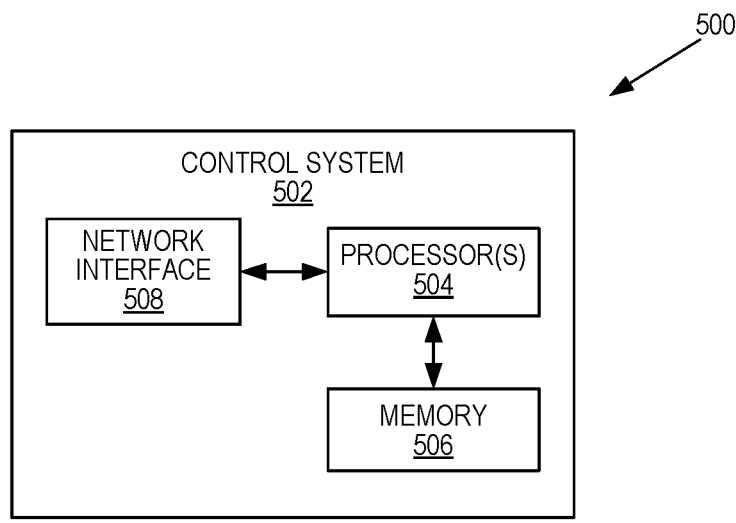
FIGS. 5 through 7 are schematic block diagrams of example embodiments of a network node.

Figure 5.2.1-1 shows the service based representation and Figure 5.2.1-1a shows the reference point representation of the reference architecture of policy and charging control framework for the 5G System.

REPRODUCED HEREIN AS FIG. 11

Figure 5.2.1-1: Overall Non-Roaming Reference Architecture of Policy and Charging Control Framework for the 5G System (Service Based Representation)

REPRODUCED HEREIN AS FIG. 12

Figure 5.2.1-1a: Overall Non-Roaming Reference Architecture of Policy and Charging Control Framework for the 5G System (Reference Point Representation), for the Deployment of the Same PCF Serving Session and Non-Session Management Policies

REPRODUCED HEREIN AS FIG. 13

Figure 5.2.1-1b: Overall Non-Roaming Reference Architecture of Policy and Charging Control Framework for the 5G System (Reference Point Representation)

NOTE 1: The N4 reference point is not part of the 5G Policy Framework architecture but shown in the figures for completeness. See TS 23.501 [2] for N4 reference point definition.

NOTE 2: How the PCF/NEF stores/retrieves information related with policy subscription data or with application data is defined in TS 23.501 [2].

The Nchf service for online and offline charging consumed by the SMF is defined in TS 32.240 [8].

The Nchf service for Spending Limit Control consumed by the PCF is defined in TS 23.502 [3].

Next Change to 3GPP 23.503

6.1.2.1 Access and Mobility Related Policy Control

The access and mobility policy control encompasses the management of service area restrictions, the management of the RFSP functionalities and UE-AMBR, and the management of the SMF selection. This clause defines the management of service area restrictions and RFSP Index for a UE registered over 3GPP access. The management of service area restrictions for a 5G-RG or a FN-CRG using W-5GAN are specified in TS 23.316 [27].

The management of service area restrictions enables the PCF of the serving PLMN (e.g. V-PCF in roaming case) to modify the service area restrictions used by AMF as described in TS 23.501 [2] clause 5.3.4.

A UE's subscription may contain service area restrictions, which may be further modified by PCF based on operator defined policies at any time, either by expanding a list of allowed TAIs or by reducing a non-allowed TAIs or by increasing the maximum number of allowed TAIs. Operator defined policies in the PCF may depend on input data such as UE location, time of day, information provided by other NFs, etc.

The AMF may report the subscribed service area restrictions received from UDM during Registration procedure or when the AMF changed, the conditions for reporting are that local policies in the AMF indicate that Access and Mobility Control is enable. The AMF reports the subscribed service area restrictions to the PCF also when the policy control request trigger for service area restrictions change, as described in clause 6.1.2.5, is met. The AMF receives the modified service area restrictions from the PCF. The AMF stores them then use it to determine mobility restriction for a UE. The PCF may indicate the AMF that there is an unlimited service area.

The service area restrictions consist of a list of allowed TAI(s) or a list of non-allowed TAI(s) and optionally the maximum number of allowed TAIs.

NOTE 1: The enforcement of the service area restrictions is performed by the UE, when the UE is in CM-IDLE state or in CM-CONNECTED state when in RRC Inactive, and in the RAN/AMF when the UE is in CM-CONNECTED state.

The management of the RFSP Index enables the PCF to modify the RFSP Index used by the AMF to perform radio resource management functionality as described in TS 23.501 [2] clause 5.3.4. PCF modifies the RFSP Index based on operator policies that take into consideration e.g. accumulated usage, load level information per network slice instance etc. The subscribed RSFP Index may be further adjusted by the PCF based on operator policies at any time. For radio resource management, the AMF may report the subscribed RFSP Index received from UDM during the Registration procedure or when the AMF changed. The conditions for reporting are that local policies in the AMF indicate that Access and Mobility Control is enable. The AMF reports the subscribed RFSP Index to the PCF when the subscription to RFSP Index change to the PCF is met. The AMF receives the modified RFSP Index from the PCF.

NOTE 2: The enforcement of the RFSP Index is performed in the RAN.

Upon change of AMF, the source AMF informs the PCF that the UE context was removed in the AMF in the case of inter-PLMN mobility.

The management of UE-AMBR enables the PCF to provide the UE-AMBR information to AMF based on serving network policy, that may take into consideration e.g. accumulated usage etc. The AMF may report the subscribed UE-AMBR received from UDM. The conditions for reporting are that the PCF provided Policy Control Request Triggers to the AMF to report subscriber UE-AMBR change. The AMF receives the modified UE-AMBR from the PCF. The AMF provides a UE-AMBR value of the serving network to RAN as specified in TS 23.501 [2], clause 5.7.2.6.

The management of the SMF selection enables the PCF to instruct the AMF to contact the PCF during the PDU Session Establishment procedure to perform a DNN replacement, as specified in TS 23.501 [2], clause 5.6.1. During UE Registration procedure and at establishment of the AM Policy Association, the PCF may provide the Policy Control Request Trigger SMF selection management together with SMF selection management information (as part of the Access and mobility management related policy control information (see clause 6.5)) to indicates the conditions to check whether to contact the PCF at PDU Session establishment as specified in clause 6.1.2.5.

Next Change to 3GPP 23.503

6.1.3.18 Event Reporting from the PCF

The AF may subscribe/unsubscribe to notifications of events from the PCF for the PDU Session to which the AF session is bound.

The events that can be subscribed by the AF are listed in Table 6.1.3.18-1.

TABLE 6.1.3.18-1

Events relevant for reporting from the PCF

| Event | Description | Conditions for reporting | Availability for Rx PDU Session (NOTE 2) | Availability for N5 PDU Session | Availability for Bulk Subscription (NOTE 1) |
| --- | --- | --- | --- | --- | --- |
| PLMN Identifier Notification | The PLMN identifier where the UE is currently located. | AF | Yes | Yes | Yes |
| Change of Access Type | The Access Type and, if applicable, the RAT Type of the PDU Session has changed. | AF | Yes | Yes | Yes |
| Signalling path status | The status of the resources related to the signalling traffic of the AF session. | AF | Yes | Yes | No |
| Access Network Charging Correlation Information | The Access Network Charging Correlation Information of the resources allocated for the AF session. | AF | Yes | Yes | No |
| Access Network Information Notification | The user location and/or timezone when the PDU Session has changed in relation to the AF session. | AF | Yes | Yes | No |
| Reporting Usage for Sponsored Data Connectivity | The usage threshold provided by the AF has been reached; or the AF session is terminated. | AF | Yes | Yes | No |
| Service Data Flow deactivation | The resources related to the AF session are released. | AF | Yes | Yes | No |
| QoS targets can no longer (or can again) be fulfilled | The QoS targets can no longer (or can again) be fulfilled by the network for (a part of) the AF session. | AF | No | Yes | No |
| QoS Monitoring parameters | The QoS Monitoring parameter(s) (e.g. UL packet delay, DL packet delay or round trip packet delay) are reported to the AF according to the QoS Monitoring reports received from the SMF. | AF | No | Yes | No |
| Out of credit | Credit is no longer available. | AF | Yes | Yes | No |
| Manageable Ethernet Port detected (NOTE 3) | Port number, optionally MAC address and optionally UE-DS-TT Residence Time for an Ethernet port which supports exchange of Port Management Information Containers. | AF | Yes | Yes | No |

TABLE 6.1.3.18-1-continued

Events relevant for reporting from the PCF

| Event | Description | Conditions for reporting | Availability for Rx PDU Session (NOTE 2) | Availability for N5 PDU Session | Availability for Bulk Subscription (NOTE 1) |
|---|---|---|---|---|---|
| Port Management Information Container Notification | A Port Management Information Container and related port number that has been received by PCF from SMF. | AF | No | Yes | No |
| Reporting Usage | The usage threshold provided by the consumer has been reached: or the usage threshold has been reset. | PCF (NOTE 4) | No | No | No |

(NOTE 1):
Additional parameters for the subscription as well as reporting related to these events are described in TS 23.502 [3].
(NOTE 2):
Applicability of Rx is described in Annex C.
(NOTE 3):
UE-DS-TT Residence Time is only provided in case a DS-TT port is detected.
(NOTE 4):
The PCF that provides non-session management policies for a UE.

If an AF requests the PCF to report the PLMN identifier where the UE is currently located, then the PCF shall provide the PLMN identifier to the AF if available. Otherwise, the PCF shall provision the corresponding PCC rules, and the Policy Control Request Trigger to report PLMN change to the SMF. The PCF shall, upon receiving of the PLMN identifier from the SMF forward this information to the AF.

If an AF requests the PCF to report on the change of Access Type, the PCF shall provide to the AF the information about the Access Type the user is currently using and upon indication of change of Access Type, notify the AF on changes of the Access Type. The PCF shall provide the corresponding Policy Control Request Trigger to report the Access Type information to the SMF. The PCF shall, upon receiving of the Access Type information from the SMF forward this information to the AF.

If an AF requests the PCF to report on the signalling path status, for the AF session, the PCF shall, upon indication of removal of PCC Rules identifying signalling traffic from the SMF report it to the AF.

If an AF requests the PCF to report Access Network Charging Correlation Information, the PCF shall provide to the AF the Access Network Charging Correlation Information, which will identify the usage reports that include measurement for the flows, once the Access Network Charging Correlation Information is known at the PCF.

If an AF requests the PCF to report Access Network Information, the PCF shall set the Access Network Information report parameters in the corresponding PCC rule(s) and provision them together with the corresponding Policy Control Request Trigger to the SMF. For those PCC rule(s) based on preliminary service information the PCF may assign the 5QI and ARP of the QoS Flow associated with the default QoS rule to avoid signalling to the UE. The PCF shall also set the corresponding Policy Control Request Trigger to the SMF. The PCF shall, upon receiving the subsequent Access Network Information report corresponding to the AF session from the SMF, forward the Access Network Information as requested by the AF.

If an AF requests the PCF to report the Usage for Sponsored Data Connectivity, the PCF shall provision the corresponding PCC rules, and the Policy Control Request Trigger to the SMF. If the usage threshold provided by the AF has been reached or the AF session is terminated, the PCF forwards such information to the AF.

If an AF requests the PCF to report the Service Data Flow deactivation, the PCF shall report release of resources to the AF. The PCF shall, upon receiving of the removal of PCC Rules from the SMF forward this information to the AF.

If an AF requests the PCF to report when the QoS targets can no longer (or can again) be fulfilled for a particular media flow, the PCF shall set the QNC indication in the corresponding PCC rule(s) that includes a GBR or delay critical GBR 5QI value and provision them together with the corresponding Policy Control Request Trigger to the SMF. At the time, the SMF notifies that GFBR can no longer (or can again) be guaranteed for a QoS Flow to which those PCC Rule(s) are bound, the PCF shall report to the AF the affected media flow and provides the indication that QoS targets can no longer (or can again) be fulfilled. If additional information is received with the notification from SMF (see clause 5.7.2.4 of TS 23.501 [2]), the PCF shall forward it to the AF.

If a consumer PCF (providing non-session management policies for the UE) subscribes to notifications when the usage reaches a certain threshold, or when the usage is below the threshold again (e.g. at the end of calendar period, or due to a voucher provided) or both, then the PCF (providing session-management policies for the UE PDU Session) notifies when the event is fulfilled.

Next Change to 3GPP 23.503

6.2.1.2 Input for PCC Decisions

When the same PCF provides non-session and session management policies, then the PCF shall accept input for PCC decision-making from the SMF, the AMF, the CHF, the NWDAF if present, the UDR and if the AF is involved, from the AF, as well as the PCF may use its own predefined information. These different nodes should provide as much information as possible to the PCF. At the same time, the information below describes examples of the information provided. Depending on the particular scenario all the information may not be available or is already provided to the PCF.

When a PCF provides non-session management policies to the AMF and to the UE, as defined in 3GPP TS 23.501, then input from the AMF, the NWDAF, the UDR and the PCF serving session management policies is taken into account. When a PCF provides session management policies to the SMF as defined then input from the SMF, the AF, the UDR, the NWDAF, the CHF is taken into account. The AMF may provide the following information:

SUPI;
The PEI of the UE;
Location of the subscriber;
Service Area Restrictions;
RFSP Index;
RAT Type;
GPSI;
Access Type;
Serving Network identifier (PLMN ID or PLMN ID and NID, see clause 5.34 of TS 23.501 [2]);
Allowed NSSAI;
UE time zone;
Subscribed UE-AMBR;
Mapping Of Allowed NSSAI;
S-NSSAI for the PDU Session;
Requested DNN.
NOTE 1: The Access Type and RAT Type parameters should allow extension to include new types of accesses.

The UE may provide the following information:
OSId;
List of PSIs;
Indication of UE support for ANDSP.

The SMF may provide the following information:
SUPI;
The PEI of the UE;
IPv4 address of the UE;
IPv6 network prefix assigned to the UE;
Default 5QI and default ARP;
Request type (initial, modification, etc.);
Type of PDU Session (IPv4, IPv6, IPv4v6, Ethernet, Unstructured);
Access Type;
RAT Type;
GPSI;
Internal-Group Identifier
Location of the subscriber;
S-NSSAI;
NSI-ID (if available);
DNN;
Serving Network identifier (PLMN ID or PLMN ID and NID, see clause 5.34 of TS 23.501 [2]);
Application identifier;
Allocated application instance identifier;
Detected service data flow descriptions;
UE support of reflective QoS (as defined in clause 5.7.5.1 of TS 23.501 [2]);
Number of supported packet filters for signalled QoS rules (indicated by the UE as defined in clause 5.7.5.1 of TS 23.501 [2]);
3GPP PS Data Off status;
DN Authorization Profile Index (see clause 5.6.6 of TS 23.501 [2]);
Session AMBR (see clause 5.6.6 of TS 23.501 [2]).

The UDR may provide the information for a subscriber connecting to a specific DNN and S-NSSAI, as described in the sub clause 6.2.1.3.

The UDR may provide the following policy information related to an ASP:
The ASP identifier;
A transfer policy together with a Background Data Transfer Reference ID, the volume of data to be transferred per UE, the expected amount of UEs.
NOTE 2: The information related with AF influence on traffic routing may be provided by UDR when the UDR serving the NEF is deployed and stores the application request.

The AF, if involved, may provide the following application session related information directly or via NEF, e.g. based on SIP and SDP:
Subscriber Identifier;
IP address of the UE;
Media Type;
Media Format, e.g. media format sub-field of the media announcement and all other parameter information (a=lines) associated with the media format;
Bandwidth;
Sponsored data connectivity information;
Flow description, e.g. source and destination IP address and port numbers and the protocol;
AF application identifier;
AF-Service-Identifier, or alternatively, DNN and possibly S-NSSAI
AF Communication Service Identifier (e.g. IMS Communication Service Identifier), UE provided via AF;
AF Application Event Identifier;
AF Record Information;
Flow status (for gating decision);
Priority indicator, which may be used by the PCF to guarantee service for an application session of a higher relative priority;
NOTE 3: The AF Priority information represents session/application priority and is separate from the MPS 5GS Priority indicator.
Emergency indicator;
Application service provider;
DNAI;
Information about the N6 traffic routing requirements;
GPSI;
Internal-Group Identifier;
Temporal validity condition;
Spatial validity condition;
AF subscription for early and/or late notifications about UP management events;
AF transaction identifier;
TSN AF Parameters:
  Burst Arrival Time in reference to TSN GM;
  Periodicity in reference to TSN GM;
  Flow direction;
  Delay Requirement in reference to TSN GM.
QoS information to be monitored;
Reporting frequency.

The AF may provide the following background data transfer related information via NEF:
Background Data Transfer Reference ID.
Background Data Transfer Policy.
Volume per UE.
Number of UEs.
Desired time window.
Network Area Information.

The CHF, if involved, may provide the following information for a subscriber:
Policy counter status for each relevant policy counter.
The NWDAF, if involved, may provide analytics information as described in clause 6.1.1.3.
The PCF providing session management policies, may expose the events related to a PDU session listed in clause 6.1.3.18,
In addition, the predefined information in the PCF may contain additional rules based on charging policies in the network, whether the subscriber is in its home network or roaming, depending on the QoS Flow attributes.
The 5QIs (see clause 5.7.4 of TS 23.501 [2]) in the PCC rule is derived by the PCF from AF or UDR interaction if available. The input can be SDP information or other available application information, in line with operator policy.
The Allocation and Retention Priority in the PCC Rule is derived by the PCF from AF or UDR interaction if available, in line with operator policy.

End of Changes to 3GPP 23.503

FIG. 5 is a schematic block diagram of a network node 500 according to some embodiments of the present disclosure. Optional features are represented by dashed boxes. The network node 500 may be, for example, a network node that implements a NF within the core network 110 such as, e.g., the AM-PCF 210-AM or the SM-PCF 210-SM described herein. As illustrated, the network node 500 includes a control system 502 that includes one or more processors 504 (e.g., Central Processing Units (CPUs), Application Specific Integrated Circuits (ASICs), Field Programmable Gate Arrays (FPGAs), and/or the like), memory 506, and a network interface 508. The one or more processors 504 are also referred to herein as processing circuitry. The one or more processors 504 operate to provide one or more functions of a network node 500 as described herein (e.g., one or more functions of the AM-PCF 210-AM or the SM-PCF 210-SM described herein). In some embodiments, the function(s) are implemented in software that is stored, e.g., in the memory 506 and executed by the one or more processors 504.

Figure 6:
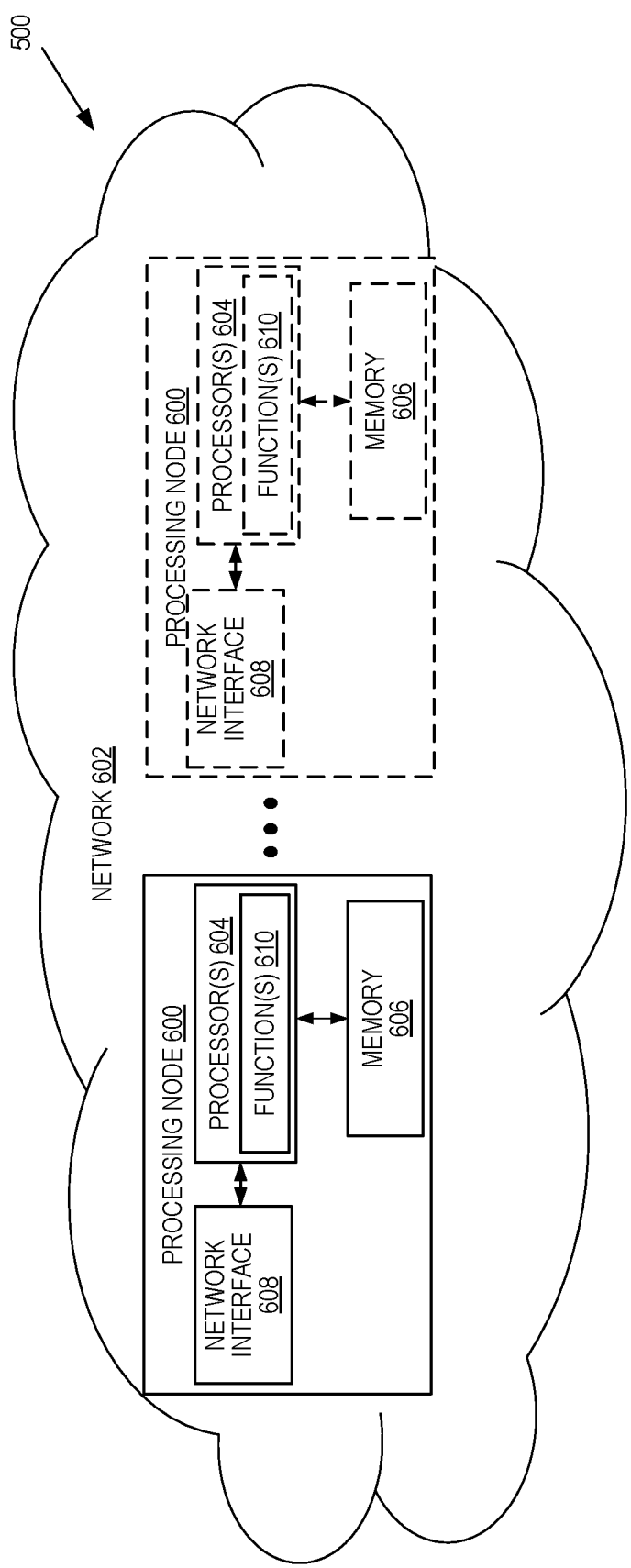
Figure 8:
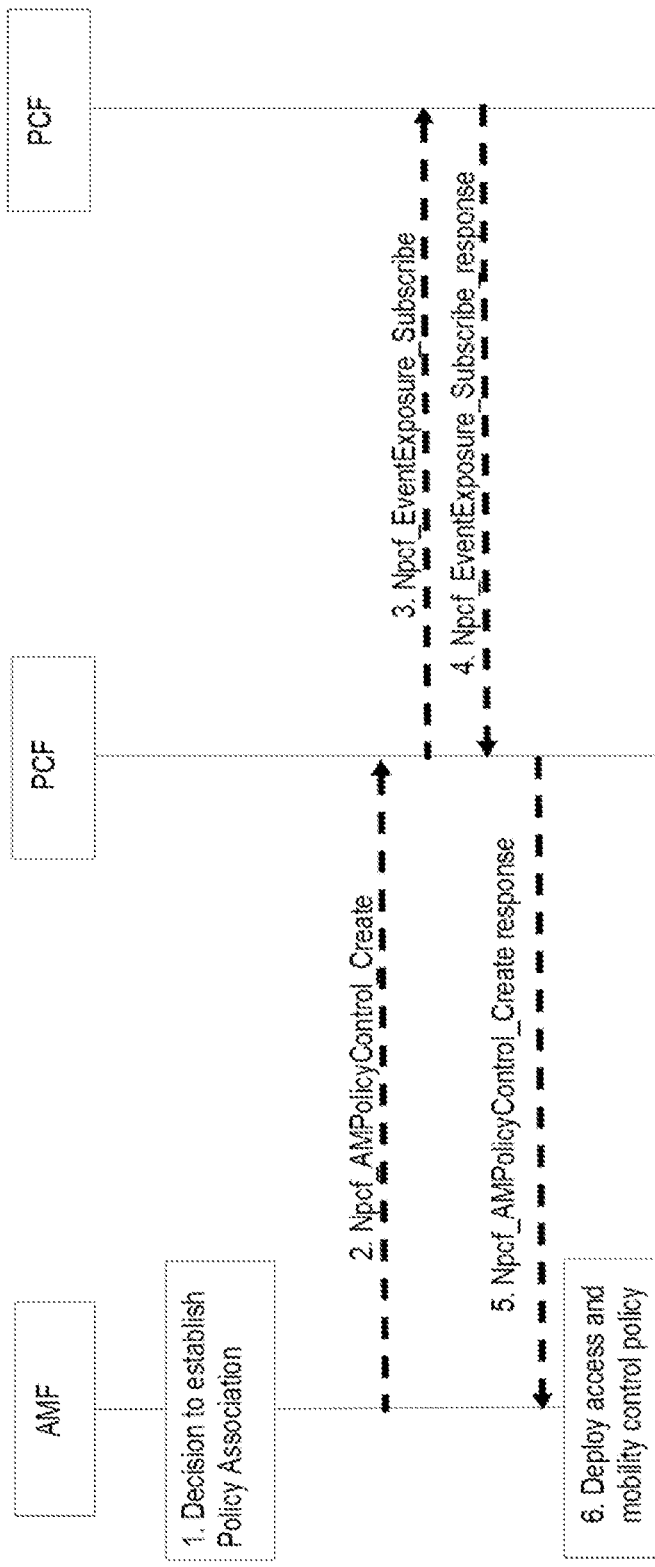
FIGS. 8 through 13 are various figures from changes made to Third Generation Partnership Project (3GPP) Technical Specification (TS) 23.502 V16.3.0 and 3GPP TS 23.503 V16.3.0, in accordance with example embodiments of the present disclosure.
Figure 9:
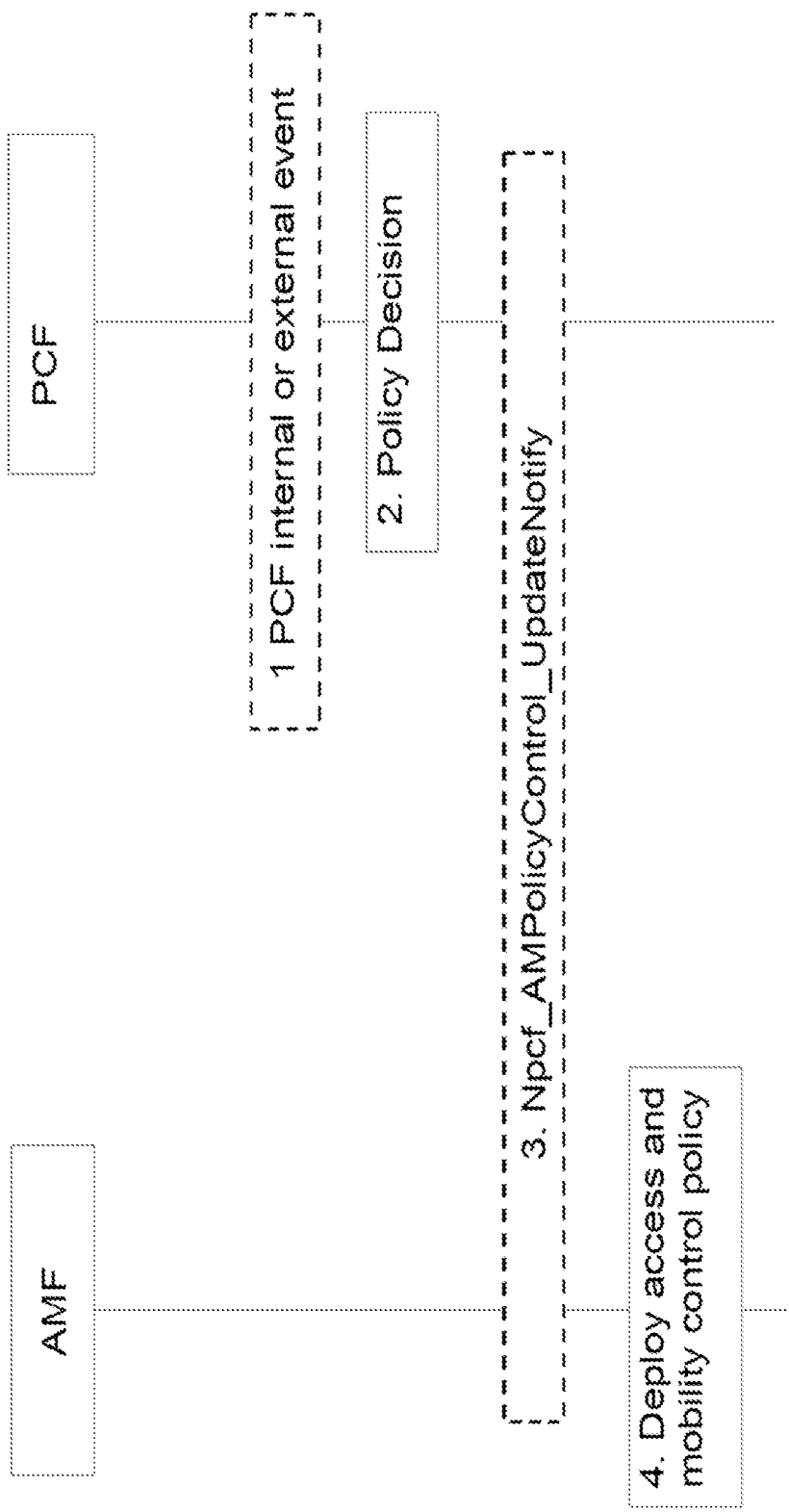
Figure 10:
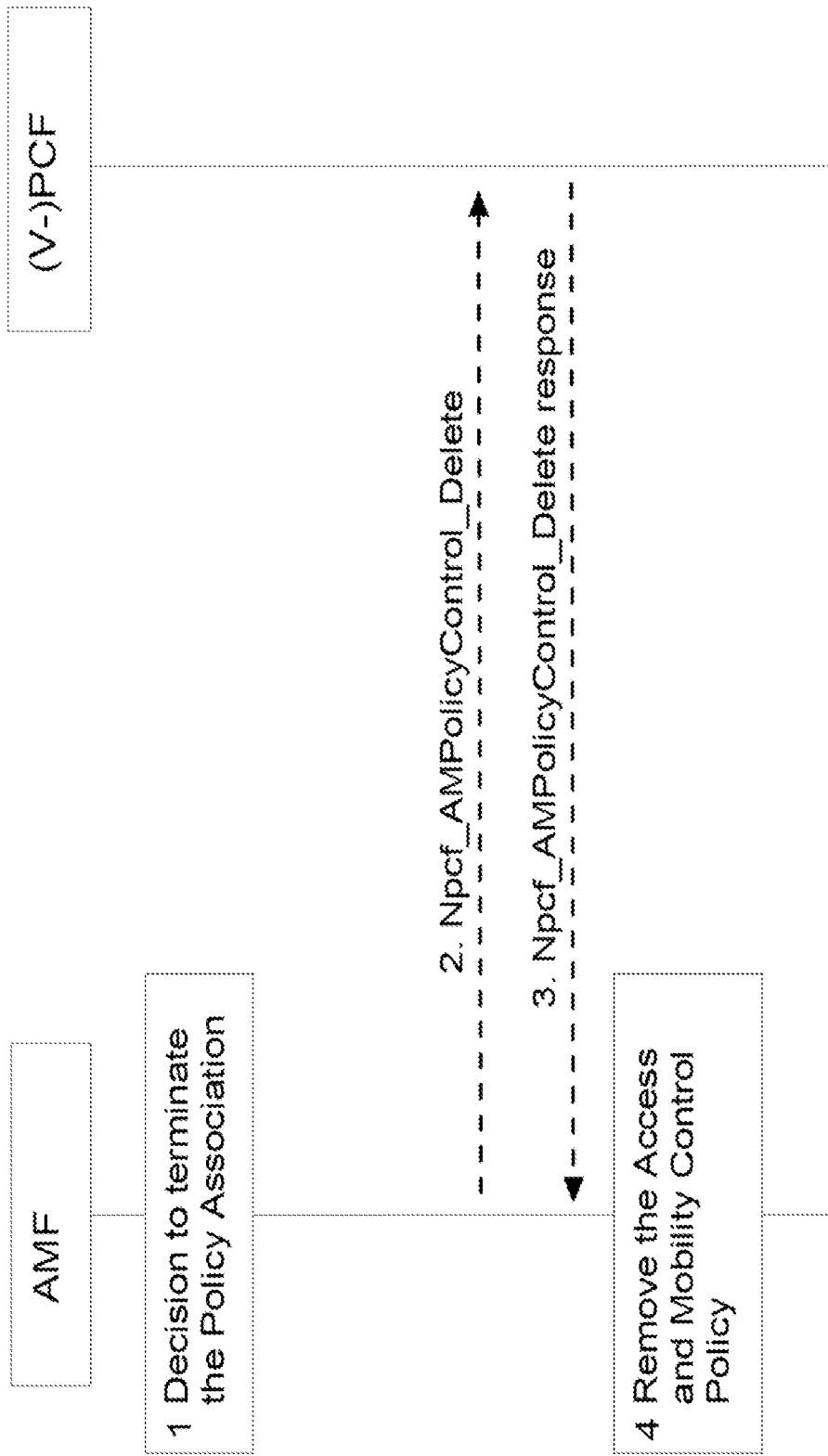
Figure 11:
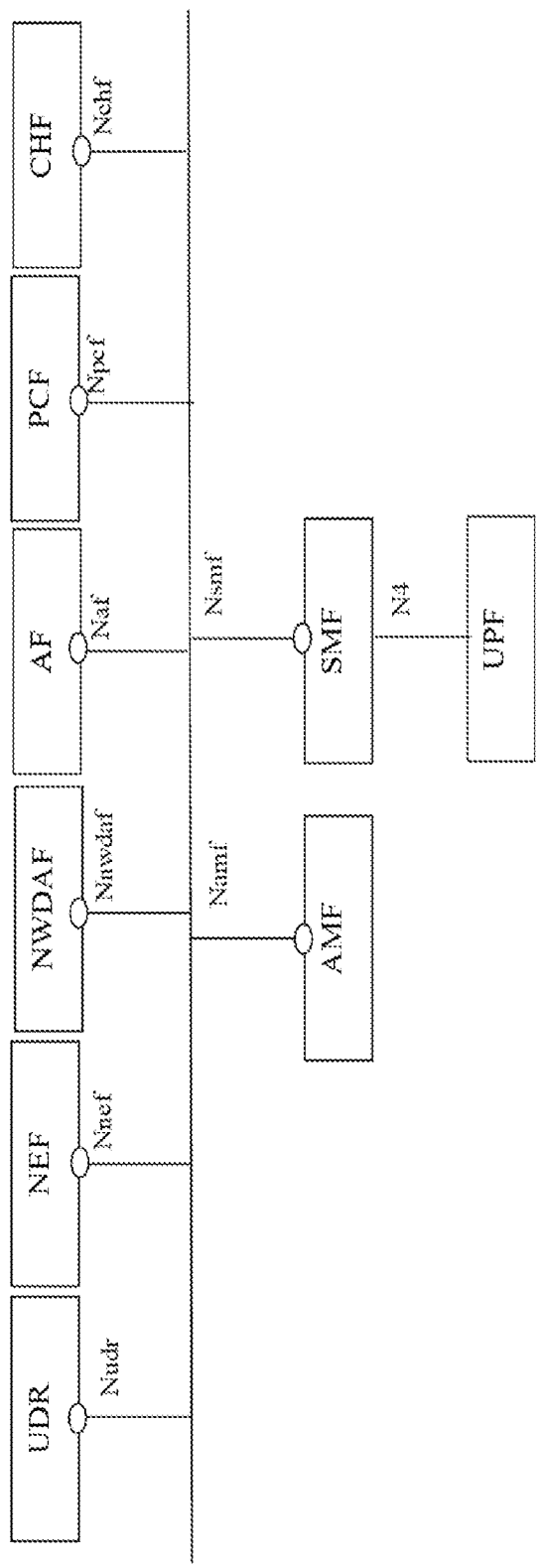
Figure 12:
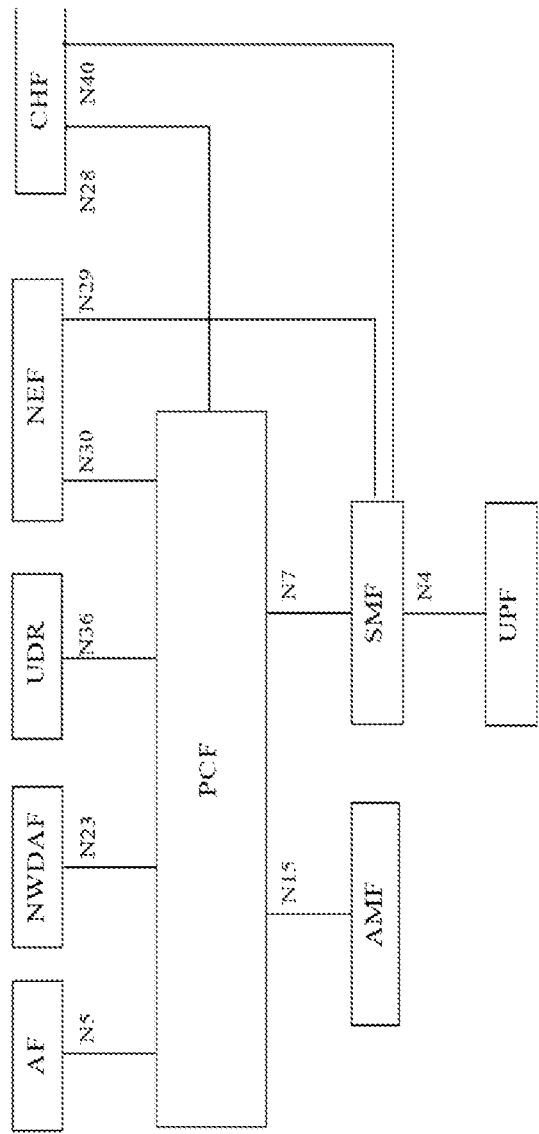
Figure 13:
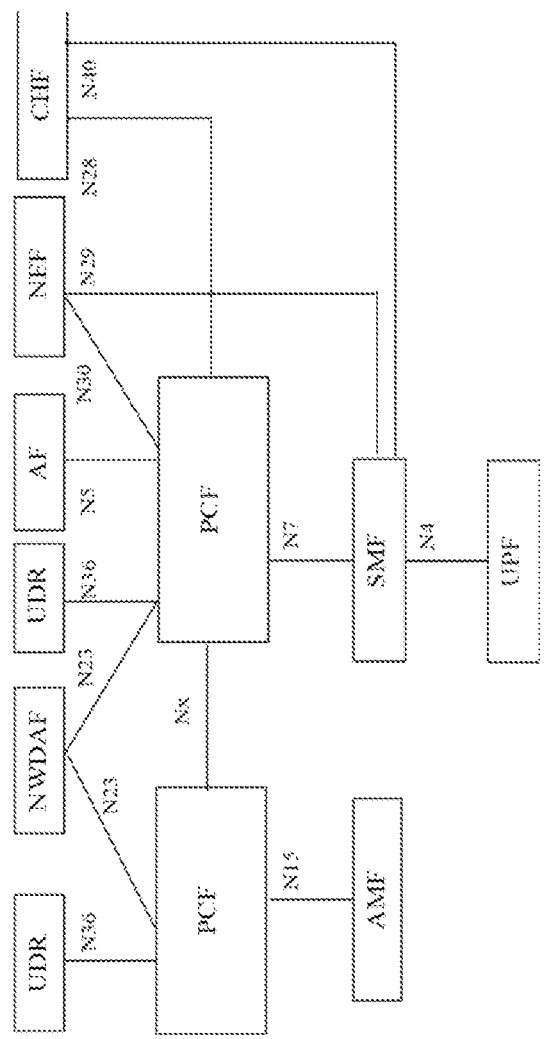

FIG. 6 is a schematic block diagram that illustrates a virtualized embodiment of the network node 500 according to some embodiments of the present disclosure. As used herein, a "virtualized" network node is an implementation of the network node 500 in which at least a portion of the functionality of the network node 500 is implemented as a virtual component(s) (e.g., via a virtual machine(s) executing on a physical processing node(s) in a network(s)). As illustrated, in this example, the network node 500 includes one or more processing nodes 600 coupled to or included as part of a network(s) 602. Each processing node 600 includes one or more processors 604 (e.g., CPUs, ASICs, FPGAs, and/or the like), memory 606, and a network interface 608. In this example, functions 610 of the network node 500 described herein (e.g., one or more functions of the AM-PCF 210-AM or the SM-PCF 210-SM described herein) are implemented at the one or more processing nodes 600 or distributed across the multiple processing nodes 600 in any desired manner. In some particular embodiments, some or all of the functions 610 of the network node 500 described herein are implemented as virtual components executed by one or more virtual machines implemented in a virtual environment(s) hosted by the processing node(s) 600.

In some embodiments, a computer program including instructions which, when executed by at least one processor, causes the at least one processor to carry out the functionality of the network node 500 or a node (e.g., a processing node 600) implementing one or more of the functions 610 of the network node 500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 7:
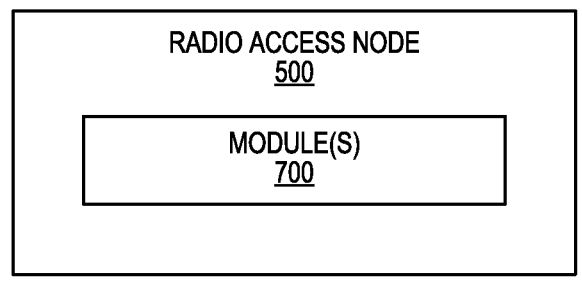

FIG. 7 is a schematic block diagram of the network node 500 according to some other embodiments of the present disclosure. The network node 500 includes one or more modules 700, each of which is implemented in software. The module(s) 700 provide the functionality of the network node 500 described herein (e.g., one or more functions of the AM-PCF 210-AM or the SM-PCF 210-SM described herein). This discussion is equally applicable to the processing node 600 of FIG. 6 where the modules 700 may be implemented at one of the processing nodes 600 or distributed across multiple processing nodes 600.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method performed by a first Policy and Control Function, PCF, (210-AM) serving an Access Management, AM, policy association for a User Equipment, UE, wherein the first PCF is comprised in a core network (110) of a cellular communications system (100), the method comprising: subscribing (404) to an event exposure service of a second PCF (210-SM) serving a Session Management, SM, policy association for the UE, wherein the event exposure service supports reporting of usage monitoring information for the UE; and, responsive to subscribing (404) to the event exposure service of the second PCF (210-SM), receiving (406) a report from the second PCF (210-SM) comprising usage monitoring information for the UE.

Embodiment 2: The method of embodiment 1 wherein the usage monitoring information comprises information that reports that the UE has reached a predefined or preconfigured usage threshold.

Embodiment 3: The method of embodiment 1 or 2 further comprising: receiving (402), from an Access and Mobility Management Function (200), a request to create an AM policy for the UE; wherein subscribing (404) to the event exposure service of the second PCF (210-SM) comprises subscribing (404) to the event exposure service of the second PCF (210-SM) responsive to receiving (402) the request to create the AM policy for the UE from the AMF (200).

Embodiment 4: The method of embodiment 3 further comprising sending (408) AM related policy information (e.g., Service Area Restrictions) for the UE to the AMF (200).

Embodiment 5: The method of embodiment 3 or 4 wherein the first PCF (210-AM) modifies an RFSP index used by the AMF (200) to perform radio resource management functionality with respect to the UE based on one or more operator policies that take into consideration the received usage monitoring information for the UE.

Embodiment 6: A method performed by a second Policy and Control Function, PCF, (210-SM) serving a Session Management, SM, policy association for a User Equipment, UE, wherein the second PCF (210-SM) is comprised in a core network (110) of a cellular communications system (100), the method comprising: receiving (404), from a first PCF (210-AM) serving an Access Management, AM, policy association for the UE, a message subscribing to an event exposure service of the second PCF (210-SM), wherein the event exposure service supports reporting of usage monitoring information for the UE; and, responsive to receiving (404) the message subscribing to the event exposure service of the second PCF (210-SM), sending (406) a report to the first PCF (210-AM) comprising usage monitoring information for the UE.

Embodiment 7: The method of embodiment 6 wherein the usage monitoring information comprises information that reports that the UE has reached a predefined or preconfigured usage threshold.

Embodiment 8: A network node (500) adapted to perform the method of any one of embodiments 1 to 7.

Embodiment 9: A method executed in a core network (110) of a cellular communications system (100) comprising:
- at a first Policy and Control Function, PCF, (210-AM) serving an Access Management, AM, policy association for a User Equipment, UE:
  - subscribing (404) to an event exposure service of a second PCF (210-SM) serving a Session Management, SM, policy association for the UE, wherein the event exposure service supports reporting of usage monitoring information for the UE; and
  - responsive to subscribing (404) to the event exposure service of the second PCF (210-SM), receiving (406) a report from the second PCF (210-SM) comprising usage monitoring information for the UE; and
- at the second PCF (210-SM) serving the SM policy association for the UE:
  - receiving (404) the message subscribing to the event exposure service of the second PCF (210-SM) from the first PCF (210-AM); and
  - responsive to receiving (404) the message subscribing to the event exposure service of the second PCF (210-SM), sending (406) the report to the first PCF (210-AM) comprising the usage monitoring information for the UE.

Embodiment 10: The method of embodiment 9 wherein the usage monitoring information comprises information that reports that the UE has reached a predefined or preconfigured usage threshold.

Embodiment 11: The method of embodiment 9 or 10 further comprising, at the first PCF (210-AM): receiving (402), from an Access and Mobility Management Function (200), a request to create an AM policy for the UE; wherein subscribing (404) to the event exposure service of the second PCF (210-SM) comprises subscribing (404) to the event exposure service of the second PCF (210-SM) responsive to receiving (402) the request to create the AM policy for the UE from the AMF (200).

Embodiment 12: The method of embodiment 11 further comprising, at the first PCF (210-AM), sending (408) AM related policy information (e.g., Service Area Restrictions) for the UE to the AMF (200).

Embodiment 13: The method of embodiment 11 or 12 wherein the first PCF (210-AM) modifies an RFSP index used by the AMF (200) to perform radio resource management functionality with respect to the UE based on one or more operator policies that take into consideration the received usage monitoring information for the UE.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

The invention claimed is:

1. A method performed by a first Policy and Control Function, PCF, serving an Access Management, AM, policy association for a User Equipment, UE, wherein the first PCF is comprised in a core network of a cellular communications system, the method comprising:
   subscribing by the first PCF serving the AM policy association of the UE to an event exposure service of a second PCF serving a Session Management, SM, policy association for the UE; and
   responsive to subscribing to the event exposure service of the second PCF, receiving a report from the second PCF serving the SM policy association for the UE.

2. The method of claim 1 wherein the event exposure service supports reporting of usage monitoring information for the UE, and the report received from the second PCF comprises usage monitoring information for the UE.

3. The method of claim 2 wherein the usage monitoring information comprises information that reports that the UE has reached a predefined or preconfigured usage threshold.

4. The method of claim 2 wherein the usage monitoring information comprises information that reports that a predefined or preconfigured usage threshold has been reset.

5. The method of claim 2 further comprising:
   receiving, from an Access and Mobility Management Function, AMF, a request to create or modify an AM policy for the UE;
   wherein subscribing to the event exposure service of the second PCF comprises subscribing to the event exposure service of the second PCF responsive to receiving the request to create or modify the AM policy for the UE from the AMF.

6. The method of claim 5 further comprising sending AM related policy information for the UE to the AMF.

7. The method of claim 6 wherein the AM related policy information comprises service area restrictions.

8. The method of claim 5 wherein the first PCF modifies an Radio Access Technology, RAT, /Frequency Selection Priority, RFSP, index used by the AMF to perform radio resource management functionality with respect to the UE based on one or more operator policies that take into consideration the received usage monitoring information for the UE.

9. A method performed by a second Policy and Control Function, PCF, serving a Session Management, SM, policy association for a User Equipment, UE, wherein the second PCF is comprised in a core network of a cellular communications system, the method comprising:
   receiving, from a first PCF serving an Access Management, AM, policy association for the UE, a message subscribing to an event exposure service of the second PCF; and
   responsive to receiving the message subscribing to the event exposure service of the second PCF, sending a report to the first PCF comprising usage monitoring information for the UE.

10. The method of claim 9 wherein the event exposure service supports reporting of usage monitoring information for the UE, and the report received from the second PCF comprises usage monitoring information for the UE.

11. The method of claim 10 wherein the usage monitoring information comprises information that reports that the UE has reached a predefined or preconfigured usage threshold.

12. The method of claim 10 wherein the usage monitoring information comprises information that reports that a predefined or preconfigured usage threshold has been reset.

13. A method executed in a core network of a cellular communications system comprising:
   at a first Policy and Control Function, PCF, serving an Access Management, AM, policy association for a User Equipment, UE:
      subscribing by the first PCF serving the AM policy association of the UE to an event exposure service of a second PCF serving a Session Management, SM, policy association for the UE; and
      responsive to subscribing to the event exposure service of the second PCF, receiving a report from the second PCF serving the SM policy association for the UE; and
   at the second PCF serving the SM policy association for the UE:
      receiving the message subscribing to the event exposure service of the second PCF from the first PCF; and
      responsive to receiving the message subscribing to the event exposure service of the second PCF, sending the report to the first PCF.

14. The method of claim 13 wherein the event exposure service supports reporting of usage monitoring information for the UE, and the report received from the second PCF comprises usage monitoring information for the UE.

15. The method of claim 14 wherein the usage monitoring information comprises information that reports that the UE has reached a predefined or preconfigured usage threshold.

16. The method of claim 14 further comprising, at the first PCF:
   receiving, from an Access and Mobility Management Function, AMF, a request to create or modify an AM policy for the UE;
   wherein subscribing to the event exposure service of the second PCF comprises subscribing to the event exposure service of the second PCF responsive to receiving the request to create or modify the AM policy for the UE from the AMF.

17. The method of claim 16 further comprising, at the first PCF, sending AM related policy information for the UE to the AMF.

18. The method of claim 16 wherein the first PCF modifies a Radio Access Technology, RAT, /Frequency Selection Priority, RFSP, index used by the AMF to perform radio resource management functionality with respect to the UE based on one or more operator policies that take into consideration the received usage monitoring information for the UE.

* * * * *